United States Patent [19]
Solari

[11] Patent Number: 5,810,065
[45] Date of Patent: Sep. 22, 1998

[54] ROLLER CURTAIN FOR WINDOWS OF MOVING VEHICLES

[75] Inventor: Antonio Solari, Cicagna, Italy

[73] Assignee: Flexso S.R.L., Cicagna, Italy

[21] Appl. No.: 840,546

[22] Filed: Apr. 2, 1997

[51] Int. Cl.$^6$ .................................................. A47G 5/02
[52] U.S. Cl. .......................................... 160/310; 160/265
[58] Field of Search ............................ 160/98, 310, 265, 160/84.02, 107, 133, 188

[56] References Cited

U.S. PATENT DOCUMENTS

| | | | |
|---|---|---|---|
| 1,657,839 | 1/1928 | Nagy | 160/98 X |
| 3,089,540 | 5/1963 | Schwartz | 160/98 |
| 4,503,900 | 3/1985 | Osaka et al. | 160/107 X |
| 4,817,698 | 4/1989 | Rossini et al. | 160/107 |
| 4,917,167 | 4/1990 | Voss et al. | 160/107 X |
| 4,979,552 | 12/1990 | Van Der Zanden | 160/107 |
| 5,139,075 | 8/1992 | Desrochers | 160/310 X |
| 5,540,269 | 7/1996 | Plumer | 160/310 X |

*Primary Examiner*—David M. Purol
*Attorney, Agent, or Firm*—Graham & James LLP

[57] ABSTRACT

Electromechanical or manually operable vertical-moving roller curtains for windows which consist of a curtain made of thin and flexible material, wrapped around a self-winding upper roller and a lower edge fastened to a rigid horizontal crossbar. The crossbar is connected by vertical worm screw linkages to sliders. The worm screws and sliders have a matching thread meshing for driving connection therebetween. A geared motor or a crank drives the worm screws through a drive shaft and through bevel gear pairs. A surrounding hollowed frame consists of vertical and horizontal section bars, connected by linkage so that when the motor or crank is driven a rotation is imparted to the worm screws which, via sliders, vertically move the lower edge of the curtain upwards or downwards, thereby winding and unwinding the curtain on the upper roller.

10 Claims, 2 Drawing Sheets

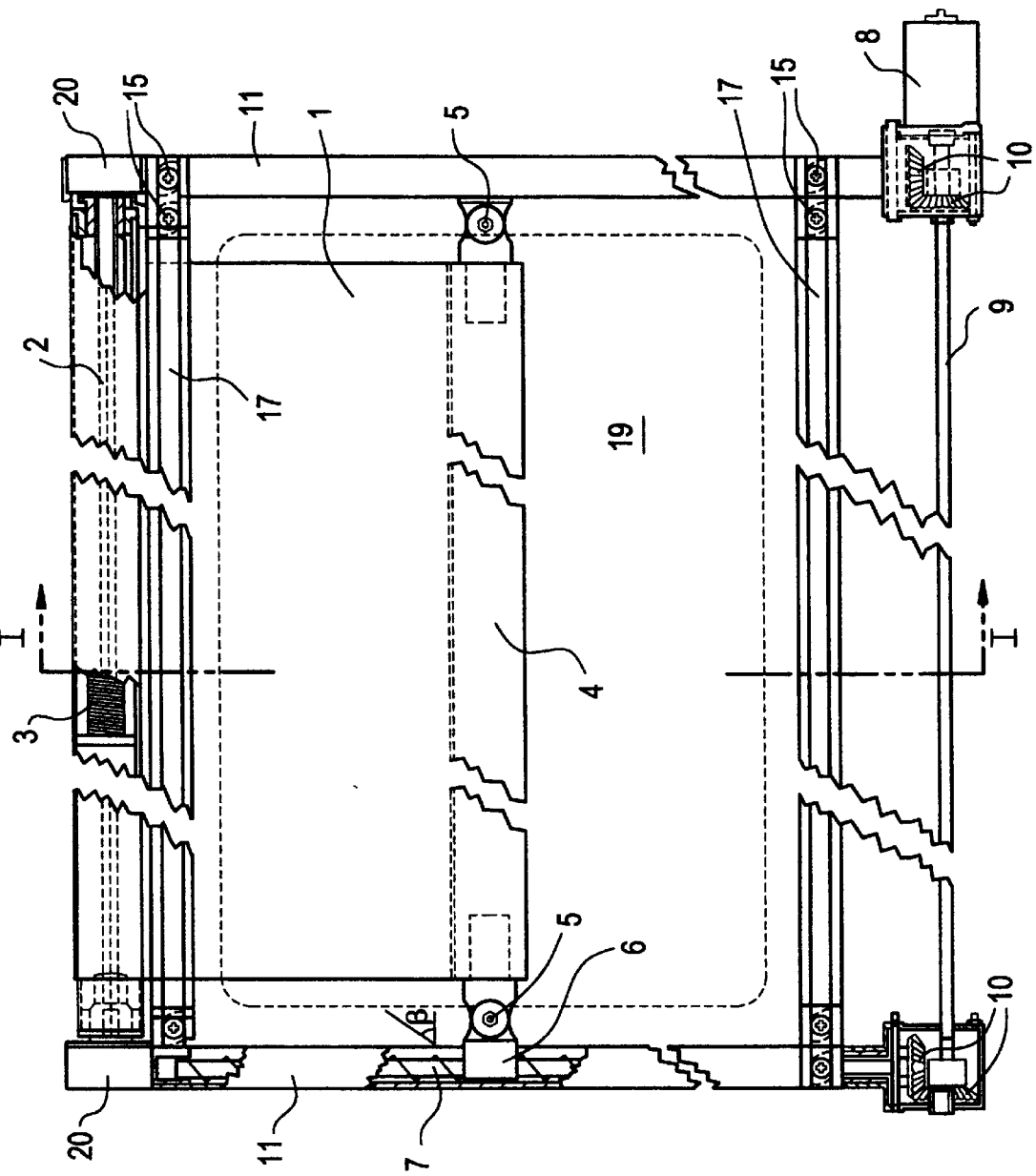

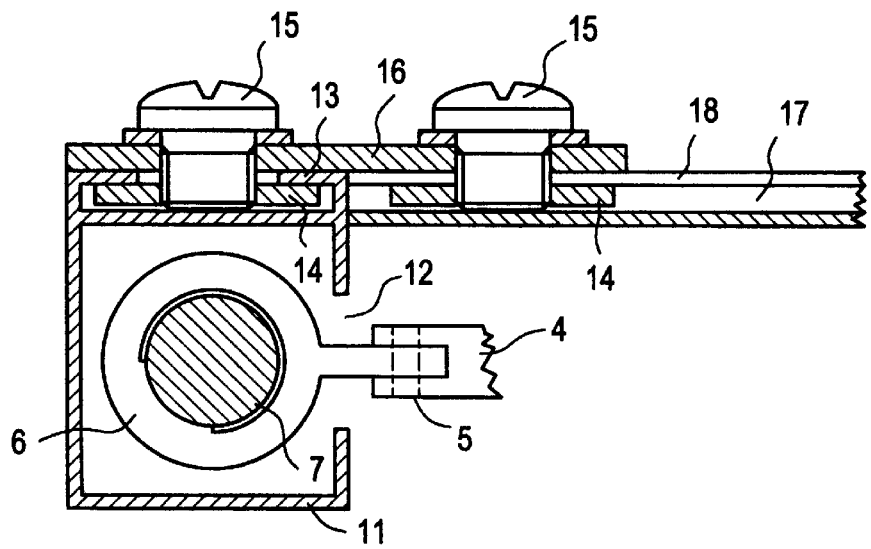
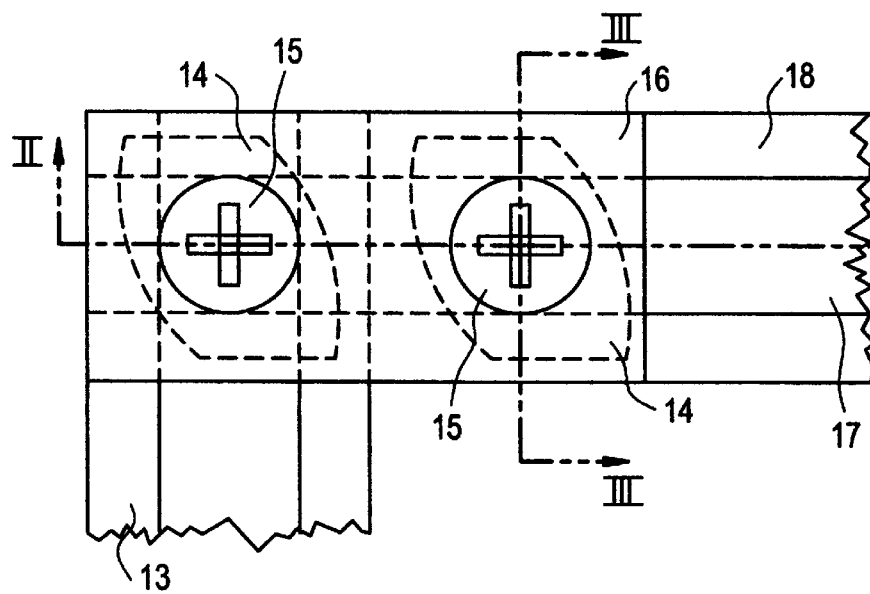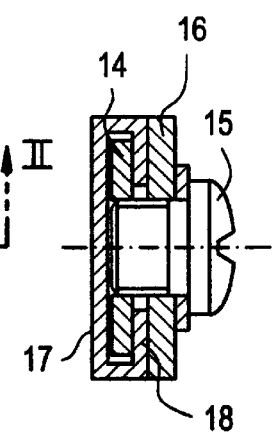

5,810,065

ROLLER CURTAIN FOR WINDOWS OF MOVING VEHICLES

FIELD OF THE INVENTION

This invention relates to vertically movable roller curtains which partially or totally cover the insides of windows or door-window panes and particularly windows of moving vehicles.

BACKGROUND OF THE INVENTION

DESCRIPTION OF PRIOR ART

Roller curtains are commonly known and used for house windows or windows of rail passenger-cars, coaches, industrial vehicles, watercraft boats, etc , and generally feature a panel of thin flexible material, such as fabric, plastic or other suitable material, which, by sliding, partially or totally covers the windowpane. The flexible is, at present, operated by hand, and has slides at its lower edge, which are by grooves located in the opposite internal sides of the door or window frame.

Such arrangement has some drawbacks. A first drawback is that these hand-operated roller curtains usually do not initially assume or maintain a stable position and autonomously vary their coverage, especially in train passenger-cars and vehicles which are to strong vibrations. A second drawback is due to the fact that during the operation of the roller curtain,) sometimes carried out without great delicacy), the side guide sliders may either get stuck in the groove thus blocking the movement of the curtain, or the slider slip out of the grooves thus making the curtain useless, and annoying the user.

These well-known vertically-moving curtains may also be electromechanically controlled. However, in case of failure or malfunctioning of this electromechanic drive, the curtain cannot be operated manually and is rendered useless. It should be mentioned that there are also blinds consisting of horizontal interconnected strips, with side guides and electromechanical drives, with the strips being stacked in the upper area when the blind is open and which strips are distributed along the window surface when the blind is closed. These strip blinds however have the drawback that the failure of even only one of the strip links, blocks further movement of the blind and makes it useless. There are horizontally-moving unitary curtains with vertical folds but their great drawback is that, particularly in rail passenger-cars, they tend to flap and become tattered when used with open windows.

SUMMARY OF THE INVENTION

The present invention comprises a panel-type roller curtain which is of a thin and flexible material with means for electromechanical or manual vertical movement therefor, which eliminates the drawbacks of the prior art curtains.

In accordance with the present invention the curtain is operated at both sides of the lower end by a system of sliders and corresponding worm screws, with the worm screws being controlled by a single electric geared motor through driving gears. At its upper end the curtain is wrapped around a self-winding roller, which automatically rewinds the curtain and applies a pulling force which prevents flapping and tattering.

The worm screws and corresponding sliders provide threads with a high lead angle relative to the horizontal plane, so that the curtain may be manually operated in case of failure of the electromechanic driving mechanism, which in such case is operated by hand.

The present invention is illustrated in one exemplifying implementation in the enclosed drawings, in which:

BRIEF DESCRIPTION OF THE DRAWINGS

FIG. 1 shows a front view and partial section of the curtain of this invention and relevant frame, FIG. 2 shows the cross section along line I—I of the curtain in FIG. 1, FIG. 3 shows a magnified front view of the junction of the section bars forming the curtain frame, FIG. 4 shows the longitudinal section of the frame along line II—II in FIG. 3, FIG. 5 shows a cross section of the frame along line III—III in FIG. 3.

DETAILED DESCRIPTION OF THE DRAWINGS AND THE PREFERRED EMBODIMENT(S);

With reference to the above drawings, the thin panel-like curtain 1 made of flexible material such as fabric, plastic or other suitable material is wrapped around a rotating roller 2 fitted with axial spring 3 for self-winding. The upper edge of the above mentioned curtain 1 is fixed to the self-winding roller 2, while the lower edge is fastened, by means of stiches or seams, to a horizontal crossbar 4 of any suitable shape, such as a strip or rod, etc., made of rigid material, such as metal or hard plastic.

At each end of the above crossbar 4 are detachable links 5 connected to the sliders 6, via internal matching thread, meshing with vertical worm screws 7 with matching threads. A geared motor 8 simultaneously drives the worm screws 7 by means of a driven shaft 9 and bevel gear pairs 10 which may reduce the gear ratio.

Basically, by operating the geared motor 8 in either direction, the worm screws 7 either rotates rotate in one direction or in an opposite one thereby raising or lowering of the threaded sliders 6 which, connected to the lower crossbar 4, will push the lower edge of the curtain 1 up or down. When curtain 1 is pulled down to cover the window 19, it unwinds from the upper roller 2, with overcoming of the opposing action of spring 3. When curtain is pulled upwards it automatically winds onto the roller 2 under the action of the winding spring 3.

The matching threads of the worm screws 7 and of sliders 6 have a wide lead angle $\beta$ with respect to the transverse horizontal plane, so that, in case of failure or missing of the electromechanic drive, the curtain may be operated manually with reversible driven motion. By such hand-operation, the elctromechanic system is dragged and its inertial resistance keeps the curtain in the chosen position.

In accordance with the presents invention, the sliding curtain gently opens and closes with balanced control without the possibility of getting stuck and with maintaining of stable positioning.

In the exemplifying solution described and illustrated in the drawings the electromechanic control system is located in the lower part of the window, but it is also possible, according to this invention, to locate this control system in the upper part of the window by placing the driven shaft 9 of the geared motor 8 inside the shaft of the self-winding roller 2 and by locating the bevel gear pairs 10 in the upper boxes 20 to act as supports for the self-winding roller 2.

The curtain, as described above features a surrounding frame which makes it particularly functional and well structured. The side posts of the frame preferably consist of box-type sections 11 featuring a slot 12 facing inwards. Worm screw 7 and relevant slider 6 are placed inside each of the box-type sections 11, worm screw 7 and relevant slider 6, while the slot 12 allows passage and sliding of the link 5 which connects the crossbar 4 of the curtain 1. The box-type section 11 has the shape 13 of a channel section on one side, which is normally positioned on the inner side of the window. Inwardly facing flanges, suitable for housing one or more small plates 14, are fitted with set screws 15 of an external junction plate 16. The above fastening system with plate 16, connects the posts 11 to the crossbars 17.

To secure the frames, the lower crossbar 17 may have the shape of a double channel section, as shown by way of example in FIG. 2.

The vertical 11 and horizontal framing sections 17 may of course have different shapes, and also their connecting system may be different.

The present invention may also be used as an independent mosquito-net or in combination with the curtain where such mosquito-net is thin and flexible and is wound on the self-winding roller 2 and operated by the described eletro-mechanical system.

Obviously the geared motor 8 can be substituted by a crank so that the curtain is operated by hand.

I claim:

1. A vertically movable roller curtain for a window comprising:
    a) a thin curtain comprised of a flexible material, with said curtain being wound onto a rotating roller situated at an upper end of the roller curtain, with said rotating roller comprising a self-winding axial spring;
    b) a crossbar comprised of a rigid material horizontally disposed relative to the window and affixed to a lower end of the roller curtain;
    c) a plurality of sliders with each having internal threads, with said sliders being individually connected to ends of the crossbar via link means;
    d) a plurality of worm screws having threads which are individually meshed with the threads of the plurality of sliders and wherein the worm screws are further individually meshed with bevel gear means for operative rotational cranking of the worm screws by a rotational drive means via drive shaft means; and
    e) a frame comprised of vertical and horizontal section bars;
    wherein when the rotational drive means are operated, a rotational movement is imparted to each of the worm screws which, in turn move the sliders in a vertical direction to move a lower edge of the curtain either upwardly, with winding on the upper roller, for the uncovering thereof or downwardly relative to the window for the covering thereof, depending on the direction of rotation.

2. The roller curtain of claim 1, wherein the worm screws comprise a lead angle of the thread thereof, relative to a horizontal plane of the worm screw and the sliders whereby the thread is accessible for manual rotational operation of the roller curtain.

3. The roller curtain of claim 1, wherein the ratio of the bevel gears is adapted to reduce the rotating speed transmitted by the rotational drive means to the worm screws.

4. The roller curtain of claim 1, wherein the rotational drive means, the drive shaft means and the bevel gear means are positioned lower than the worm screws, relative to the window.

5. The roller curtain of claim 1, wherein the rotational drive means, the drive shaft means and the bevel gear means are positioned higher than the worm screws, relative to the window, and wherein the drive shaft means is operatively connected to the upper roller and wherein the bevel gear means are positioned within housings which support said upper roller.

6. The roller curtain of claim 1, wherein said frame comprises a plurality of hollow section bars which house the worm screws and sliders, with said section bars each comprising longitudinally disposed slots to permit said link means to extend between the thin curtain and the crossbar and wherein each of said hollow section bars comprises a channel section with inwardly directed flanges.

7. The roller curtain of claim 1, wherein the frame comprises either of a horizontal crossbar comprised of either of single or double channel sections with each channel section having inwardly directed flanges.

8. The roller curtain of claim 6, wherein the link means comprises plate members positioned within respective channel sections which are attached with a set screw to plates positioned on flanges of the respective channel sections, thereby connecting vertical and horizontal portions of the frame.

9. The roller curtain of claim 1, wherein the rotational drive means comprises a geared motor.

10. The roller curtain of claim 1 wherein the rotational drive means comprises a manually operated crank.

\* \* \* \* \*